United States Patent
Qureshi et al.

(10) Patent No.: US 12,499,008 B2
(45) Date of Patent: Dec. 16, 2025

(54) CONTROL REGISTER RELATED COMPUTING SYSTEM AND METHOD

(71) Applicant: Cypress Semiconductor Corporation, San Jose, CA (US)

(72) Inventors: Yasir Mahmood Qureshi, Dublin (IE); Eoin O'Brien, Bray (IE)

(73) Assignee: Cypress Semiconductor Corporation, San Jose, CA (US)

( * ) Notice: Subject to any disclaimer, the term of this patent is extended or adjusted under 35 U.S.C. 154(b) by 2 days.

(21) Appl. No.: 18/423,756

(22) Filed: Jan. 26, 2024

(65) Prior Publication Data

US 2025/0245097 A1 Jul. 31, 2025

(51) Int. Cl.
*G06F 11/08* (2006.01)
(52) U.S. Cl.
CPC .................. *G06F 11/085* (2013.01)
(58) Field of Classification Search
CPC ..................................................... G06F 11/085
See application file for complete search history.

(56) References Cited

U.S. PATENT DOCUMENTS

| | | | | |
|---|---|---|---|---|
| 6,976,204 B1* | 12/2005 | Chambers | ............ | G11C 7/1006 714/763 |
| 11,392,385 B2* | 7/2022 | Selwan | ............... | G06F 11/1641 |
| 11,861,181 B1* | 1/2024 | Moser | ................... | G06F 11/141 |
| 2008/0148121 A1* | 6/2008 | Yu | ........................ | G06F 11/0742 714/746 |
| 2010/0306626 A1* | 12/2010 | Keays | ................. | G06F 11/1048 714/752 |
| 2010/0325396 A1* | 12/2010 | Yoshida | .............. | G06F 9/30127 712/E9.017 |
| 2010/0332940 A1* | 12/2010 | Moyer | ................ | G06F 9/30181 714/752 |
| 2012/0254698 A1* | 10/2012 | Ozer | ..................... | G06F 11/106 714/764 |
| 2023/0085149 A1* | 3/2023 | Bhardwaj | ........... | G06F 13/4027 710/306 |
| 2025/0004892 A1* | 1/2025 | Gordon | ................. | G06F 11/181 |

* cited by examiner

*Primary Examiner* — Albert Decady
*Assistant Examiner* — Osman M Alshack

(57) ABSTRACT

One or more computing devices, systems, and/or methods are provided. In an example, a computing system includes a first processing complex including a first status register unit, a second processing complex including a second status register unit, a lockstep unit configured to verify redundancy in the first status register unit and the second status register unit, a control register unit connected to the lockstep unit and including control registers, each configured to store control register data and an error correction code (ECC) associated with the control register data, a scrubber configured to read the control registers at a predetermined frequency, and an ECC unit configured to, responsive to a read of a selected control register of the control registers by the scrubber, validate the control register data associated with the selected control register based on the ECC associated with the control register data.

20 Claims, 3 Drawing Sheets

CONTROL REGISTER RELATED COMPUTING SYSTEM AND METHOD

BACKGROUND

Some processors use redundant processing resources to increase robustness of a computing system where high reliability is important, for example, in a computing system employed in a vehicle. In such systems, processors, control registers, and status registers are replicated and operated in a lockstep unit. Status registers are hardware writable registers used by the processors or peripheral devices in the computing system and control registers are software writable registers used by software executed by the processors. The lockstep unit checks the data generated by the redundant resources to verify agreement.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a computing system comprises a first processing complex including a first status register unit, a second processing complex including a second status register unit, a lockstep unit configured to verify redundancy in the first status register unit and the second status register unit, a control register unit connected to the lockstep unit and comprising control registers, each configured to store control register data and an error correction code (ECC) associated with the control register data, a scrubber configured to read the control registers at a predetermined frequency, and an ECC unit configured to, responsive to a read of a selected control register of the control registers by the scrubber, validate the control register data associated with the selected control register based on the ECC associated with the control register data.

In an embodiment of the techniques presented herein, a system comprises means for verifying redundancy in a first status register unit of a first processing complex and a second status register unit of a second processing complex, means for storing control register data and an error correction code (ECC) associated with the control register data in control registers of a control register unit, means for reading the control registers at a predetermined frequency, and means for, responsive to a read of a selected control register of the control registers, validating the control register data associated with the selected control register based on the ECC associated with the control register data.

In an embodiment of the techniques presented herein, a method comprises verifying redundancy in a first status register unit of a first processing complex and a second status register unit of a second processing complex, storing control register data and an error correction code (ECC) associated with the control register data in control registers of a control register unit, reading the control registers at a predetermined frequency, and responsive to a read of a selected control register of the control registers, validating the control register data associated with the selected control register based on the ECC associated with the control register data.

In an embodiment of the techniques presented herein, a computing system comprises a first processing complex including a first status register unit comprising first status registers, a second processing complex including a second status register unit comprising second status registers, a lockstep unit configured to verify redundancy in the first status registers and the second status registers, a control register unit connected to the lockstep unit and comprising control registers, and a scrubber configured to read the first status registers, the second status registers, and the control registers at a predetermined frequency, wherein the control registers are provided with end-to-end error correction code (ECC) protection.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
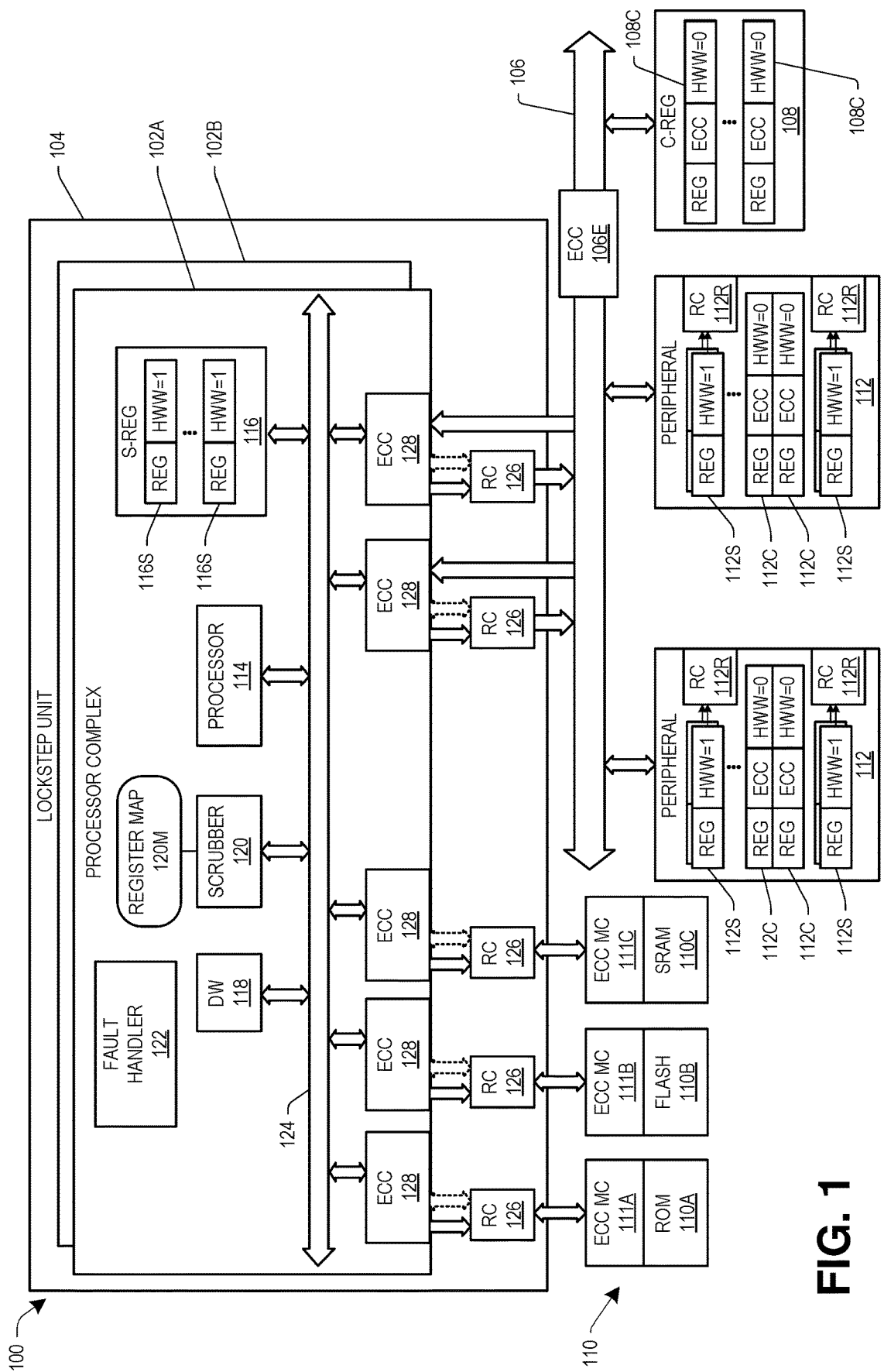
FIG. 1 is a diagram of a computing system, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

According to some embodiments, a computing system includes redundant resources, such as processors and status registers, controlled by a lockstep unit to increase robustness of the system. In some embodiments, control registers are provided outside the lockstep unit to reduce the footprint of the system compared to providing redundant control registers. To provide system robustness the control registers are provided with end-to-end (E2E) error correction code (ECC) protection rather than redundancy. In E2E-ECC an error correction code (ECC) is generated for the data stored in the control register. If data is read from the control register, the ECC is provided with the data. The ECC acts as a checksum to validate the integrity of the data, and in some cases, the ECC may be used to correct a single bit error in the data. Data that fails the ECC verification and cannot be corrected is flagged as compromised, as the failure may represent a hardware fault. The computing system may take various fault detection corrective actions, such as sending an error report or shutting down and restarting the system, depending on the severity of the fault. In some embodiments, additional status and control registers may be provided on peripheral devices in the computing system. On the peripheral devices, status registers are protected by redundancy and control registers are protected by E2E-ECC.

FIG. 1 is a diagram of a computing system 100, in accordance with some embodiments. In some embodiments, the computing system 100 comprises redundant processor complexes 102A, 102B operating in a lockstep unit 104, a peripheral bus 106, a control register unit 108 including control registers 108C, memory 110, and one or more optional peripheral devices 112. The peripheral bus 106 connects the redundant processor complexes 102A, 102B and the lockstep unit 104 to the control register unit 108 and the peripheral device(s) 112. The computing system 100 may include fewer components, additional components, different components, and/or a different arrangement of components than those illustrated in FIG. 1.

In some embodiments, each of the redundant processor complexes 102A, 102B comprises one or more processors 114, a status register unit 116 including status registers 116S, a datawire (DW) unit 118, a scrubber 120, a fault handler 122 and a system bus 124. The entities controlled by the lockstep unit 104 are protected by redundancy to increase robustness. However, for certain entities located outside the boundaries of the lockstep unit 104 protection is provided by E2E-ECC to increase robustness. The lockstep unit 104 implements redundancy checking at the boundaries of the redundant processor complexes 102A, 102B using one or more redundancy checkers 126. E2E-ECC protection is provided by one or more ECC units 128.

The buses 106, 124 includes paths that permit communication among the components of the computing system 100. For example, the buses 106, 124 may include an address bus, a data bus, a debug bus, and/or a control bus. The buses 106, 124 may also include bus drivers, bus arbiters, bus interfaces, and so forth. The processor 114 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 114 may be implemented as hardware (e.g., a microprocessor, etc.) or a combination of hardware and software (e.g., a SoC, an ASIC, etc.) and may include one or multiple internal memories (e.g., cache, etc.), etc.

In some embodiments, the memory 110 includes one or multiple memories and/or one or multiple other types of storage mediums connected to the system bus 124. For example, the memory 110 may include one or multiple types of memories, such as read only memory (ROM) 110A, flash memory 110B, or static random access memory (RAM) 110C. Other types of memory, such as dynamic random access memory (DRAM), cache, a programmable read only memory (PROM), a single in-line memory module (SIMM), a dual in-line memory module (DIMM), and/or some other suitable type of memory may also be provided. The memory 110 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 110 may include drives for reading from and writing to the storage medium. The memory 110 may be external to and/or removable from the computing system 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 110 may store data, software, and/or instructions related to the operation of the computing system 100. Each of the memories 110A, 110B, 110C may include an associated memory controller that communicates over the peripheral bus 106.

Within the redundant processor complexes 102A, 102B, the redundancy checkers 126 compare the data generated by the redundant processor complexes 102A, 102B to verify agreement. For outgoing data, the ECC units 128 generate the ECC for the outgoing data. In some embodiments, the ECC units 128 are integrated into the system bus 124. The ECC is stored with the data at the destination, for example, in the memory 110, the peripheral device 112, or the control register unit 108. For incoming data the ECC units 128 receive an ECC with the data and perform validation and error correction, if necessary. A failure of a comparison at the redundancy checkers 126 indicates a fault or data corruption on the bus 124, memory 110, or registers 108C, 112C. Faults are communicated to the fault handler 122 for processing. The fault handler 122 may take various corrective actions, depending on the nature of the fault, such as, signaling a fault condition, resetting one of the redundant processor complexes 102A, 102B, or shutting down the computing system 100.

In some embodiments, memories 110A, 110B, 110C include ECC memory controllers 111A, 111B, 111C. An ECC unit 128 and redundancy checker are instantiated for each of the ECC memory controllers 111A, 111B, 111C. The ECC memory controllers 111A, 111B, 111C validate ECCs sent by the associated ECC unit 128 for data stored in the associated memories 110A, 110B, 110C and the ECCs are stored with the data. Data is corrected using the ECC, if necessary. When data is read from one of the memories 110A, 110B, 110C, the corresponding ECC memory controller 111A, 111B, 111C validates and corrects the data if necessary and sends the ECC with the data to the associated ECC unit 128 for another validation and error correction, if necessary. The validated data is forwarded to the requesting entity by the system bus 124.

In some embodiments, ECC functionality is integrated into the peripheral bus 106, as represents by the ECC unit 106E. In some embodiments, the peripheral device 112 includes control registers 112C protected by ECC and status registers 112S protected by redundancy and redundancy checkers 112R. When data is stored in one of the status registers 112S in the peripheral device 112, the data is stored in both of the redundant status registers. When data is read from the status registers 112S in the peripheral device 112, the redundancy checker 112R verifies concurrence. Redundancy failures are reported to the fault handler 122.

The ECC unit 106E in the peripheral bus 106 may perform ECC functions for data associated with the control register unit 108 or the peripheral device 112. Separate ECC units 106E may be instantiated for each entity on the peripheral bus, such as the control register unit 108 or the peripheral devices 112. When data is read from the one of the control registers 108C, 112C, the associated ECC unit 106E validates and corrects the data and sends the ECC with the data to the associated ECC unit 128, which again validates and corrects the data to identify corruption occurring on the peripheral bus 106. When data is stored in one of the control registers 108C, 112C, the ECC unit 128 generates the ECC, and the associated ECC unit 106E validates and corrects the data and stores the data with the ECC in the control register 108C, 112C.

To increase system reliability, the scrubber 120 scans the data stored in the control registers 108C, 112C to force ECC validation. In some embodiments, the scrubber 120 is configured with a register map 120M indicating the addresses of the status registers 112S, 116S and the control registers 108C, 112C. The register map 120M may be constructed during system startup. In some embodiments, the scrubber 120 is implemented by a direct memory access (DMA) unit. For example, a DMA unit may have multiple channels, with one of the channels being reserved for the scrubbing function and another channel used to implement the DW unit 118.

A type flag may be used to distinguish the status registers 112S, 116S from the control registers 108C, 112C. For example, a hardware writable flag (HWW=1) may be set for the status registers 112S, 116S indicating that the status registers 112S, 116S are writable by hardware. The hardware writable flag (HWW=0) may be cleared for the control registers 108C, 112C indicating that the control registers 108C, 112C are software writable.

The status registers 112S, 116S do not require validation by the scrubber 120 since they are protected by redundancy. The HWW flag may be used to mask the data in the status registers 112S, 116S. In response to a read of a status register 112S, 1116S, the one of the peripheral device 112 or the status register unit 116 housing the register being read identifies the register being read as a status register 112S, 116S based on the HWW flag and masks the status register data by returning masked data, such as all zeros, for the status register data (referred to as read as zero (RAZ)) and returns an ECC corresponding to the masked data with the masked data.

In some embodiments, the scrubber 120 validates the control registers 108C, 112C by reading the control registers 108C, 112C at a predetermined frequency, such as 0.66 Hz, 2 Hz, 3.33 Hz, 6.66 Hz, or some other frequency. Reading the control registers 108C, 112C triggers ECC validation by the ECC units 106E, 128 so that the data is validated and corrected, if necessary. To protect the security of the data in the control registers 108C, 112C the scrubber 120 does not store the returned data. ECC faults are handled by the fault handler 122. This periodic validation of the control registers 108C, 112C increases the robustness of the computing system 100 without requiring the control registers 108C, 112C to be replicated, thereby reducing the footprint of the computing system 100.

Figure 2:
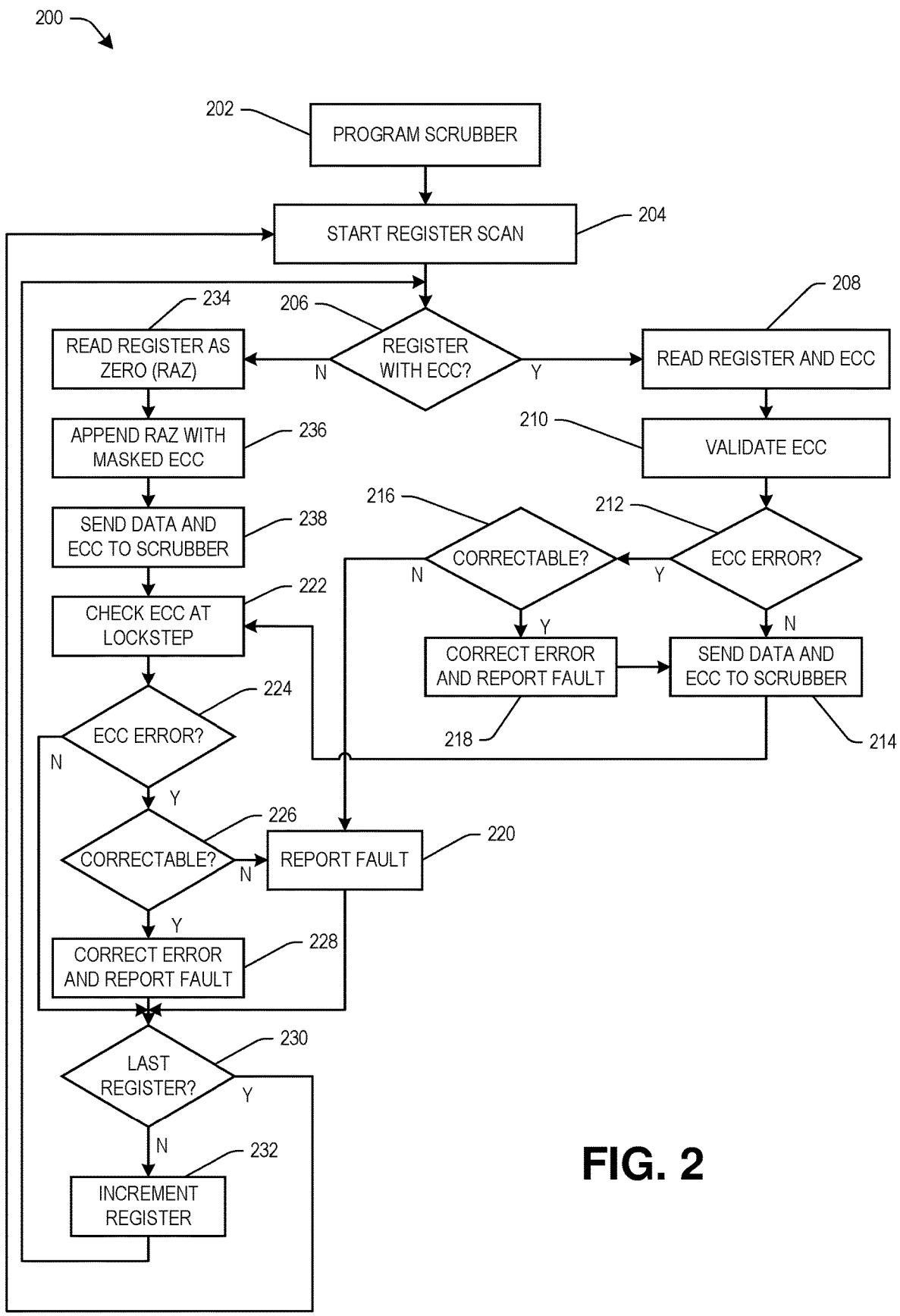
FIG. 2 is flow chart illustrating an example method for controlling a computing system, in accordance with some embodiments.

FIG. 2 is a flow chart illustrating an example method 200 for validating the control registers 108C, 112C, in accordance with some embodiments. At 202, the scrubber 120 is programmed, for example during the startup or boot of the computing system 100. In some embodiments, the scrubber 120 is programmed by populating the register map 120M with the addresses of the status registers 112S, 116S and the control registers 108C, 112C. For example, the addresses may map to the control register unit 108, the peripheral device 112, or the status register unit 116. At 204, the scrubber 120 starts a register scan. In some embodiments, the scrubber 120 repeats the register scan at a predetermined frequency, such as 0.66 Hz, 2 Hz, 3.33 Hz, 6.66 Hz, or some other frequency. If the register 108C, 112C, 112S, 116S being read is protected with ECC at 206 (e.g., HWW=0), the control register data and the ECC associated with the control register data are read from the associated control register unit 108 or peripheral device 112. At 210, the ECC is validated, for example by the ECC unit 106E. In some embodiments, the ECC is a Hamming code that supports single error correction double error detection (SECDED). In SECDED, a single bit error scan be corrected using the ECC and a two bit error can be detected but not corrected. If no ECC error is detected at 212, the register data and ECC are sent to the scrubber 120 at 214. If an ECC error is detected at 212, the ECC unit 106E determines if the error is correctable at 216 (e.g., a single bit error). If the ECE error is correctable at 216, the error is corrected and the fault is reported to the fault handler 122 at 218. If the error is not correctable at 216 the fault is reported to the fault handler 122 at 220.

Control register data sent at 214 is subjected to another ECC check in the lockstep unit 104 at 222, such as in the associated ECC unit 128. If an ECC error is detected at 224, the associated ECC unit 128 determines if the error is correctable at 226 (e.g., a single bit error). If the ECC error is correctable at 226, the error is corrected and the fault is reported to the fault handler 122 at 228. If the error is not correctable at 226 the fault is reported to the fault handler 122 at 220. If an ECC error is detected at 224, the fault is reported at 220 if the error is not correctable at 226, or the error is corrected and reported at 228, the scrubber 120 determines if the last register has been read at 230. If the last register has not been read, the register index is incremented at 232 and the scrubber 120 returns to 206 to read the next register. If the scrubbing operation is complete at 230, the scrubber returns to 204 to start the next register scan according to the predetermined frequency.

If the register 108C, 112C, 112S, 116S being read is not protected with ECC at 206 (e.g., HWW=1), the status register data is masked, such as by a read as zero (RAZ) operation at 234. The RAZ data is appended with a masked ECC (i.e., ECC corresponding to RAZ value) at 236. The masked data and the ECC associated with the masked data are sent to the scrubber at 238 and the method 200 continues at 222 as previously described.

The register scan in the method 200 forces an ECC validation of all the control registers 108C, 112C at a predetermined frequency. This check increases the robustness of the computing system 100 without requiring redundancy in the control registers 108C, 112C.

Figure 3:
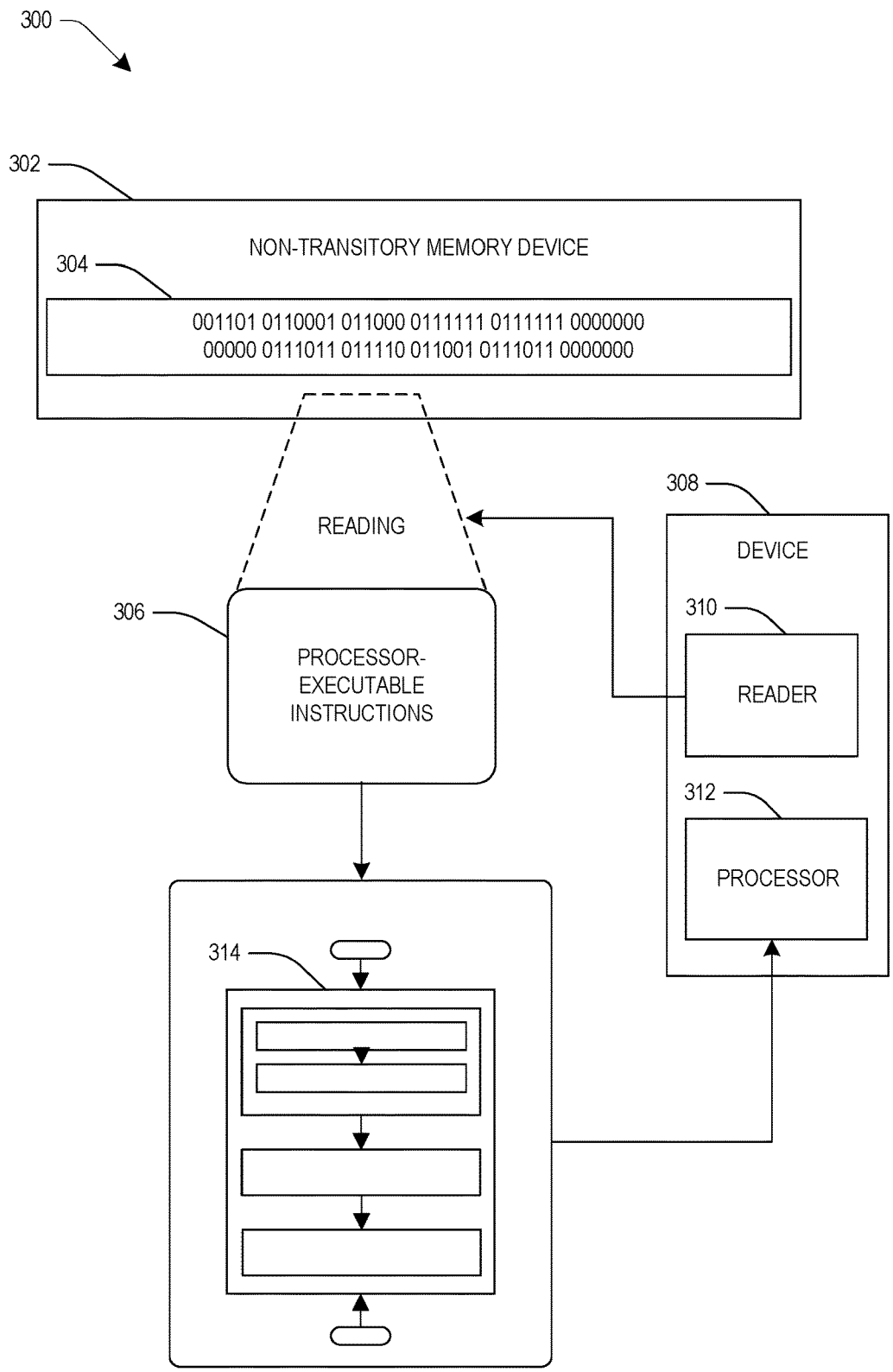
FIG. 3 illustrates an exemplary embodiment of a computer-readable medium, in accordance with some embodiments.

FIG. 3 illustrates an exemplary embodiment 300 of a computer-readable medium 302, in accordance with some embodiments. One or more embodiments involve a computer-readable medium comprising processor-executable instructions configured to implement one or more of the techniques presented herein, such as the method 200. The embodiment 300 comprises a non-transitory computer-readable medium 302 (e.g., a CD-R, DVD-R, flash drive, a platter of a hard disk drive, etc.), on which is encoded computer-readable data 304. This computer-readable data 304 in turn comprises a set of processor-executable computer instructions 306 that, when executed by a computing device 308 including a reader 310 for reading the processor-executable computer instructions 306 and a processor 312 for executing the processor-executable computer instructions 306, are configured to facilitate operations according to one or more of the principles set forth herein. In some embodiments, the processor-executable computer instructions 306, when executed, are configured to facilitate performance of a method 314, such as at least some of the aforementioned method(s). In some embodiments, the processor-executable computer instructions 306, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" and/or the like may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment of the techniques presented herein, a computing system comprises a first processing complex including a first status register unit, a second processing complex including a second status register unit, a lockstep unit configured to verify redundancy in the first status register unit and the second status register unit, a control register unit connected to the lockstep unit and comprising control registers, each configured to store control register data and an error correction code (ECC) associated with the control register data, a scrubber configured to read the control registers at a predetermined frequency, and an ECC unit configured to, responsive to a read of a selected control register of the control registers by the scrubber, validate the control register data associated with the selected control register based on the ECC associated with the control register data.

In an embodiment of the techniques presented herein, the control register data and the ECC associated with the control register data are stored in the selected control register.

In an embodiment of the techniques presented herein, the control registers are configured to store a hardware writable flag, and the control register unit is configured to output the control register data and the ECC associated with the control register data responsive to the hardware writable flag having a value indicating a software writable register.

In an embodiment of the techniques presented herein, the first status register unit comprises status registers configured to store status register data, the scrubber is configured to read a selected status register of the status registers at the predetermined frequency, and responsive to the read of the selected status register, the first status register unit is configured to mask the status register data by outputting masked data and an ECC associated with the masked data.

In an embodiment of the techniques presented herein, each status register of the status registers comprises a hardware writable flag, and the first status register unit is configured to output the masked data and the ECC associated with the masked data responsive to the hardware writable flag having a value indicating a hardware writable register.

In an embodiment of the techniques presented herein, the scrubber comprises a register map comprising addresses for the control registers and addresses for the status registers, and the scrubber is configured to read the control registers and the status registers at the predetermined frequency based on the register map.

In an embodiment of the techniques presented herein, the first status register unit comprises first status registers, the computing system comprises a bus connected to the lockstep unit, a peripheral device connected to the bus and comprising second control registers, each configured to store second control register data and a second ECC associated with the second control register data, and second status registers, the scrubber is configured to read the second control registers, the first status registers, and the second status registers at the predetermined frequency, and the ECC unit is configured to, responsive to a read of a second selected control register of the second control registers by the scrubber, validate the second control register data associated with the second selected control register based on the second ECC associated with the second control register data.

In an embodiment of the techniques presented herein, each second status register of the second status registers is configured to store second status register data, and responsive to a read of a selected second status register of the second status registers, the second status register unit is configured to mask the second status register data by outputting masked data and an ECC associated with the masked data.

In an embodiment of the techniques presented herein, a method comprises verifying redundancy in a first status register unit of a first processing complex and a second status register unit of a second processing complex, storing control register data and an error correction code (ECC) associated with the control register data in control registers of a control register unit, reading the control registers at a predetermined frequency, and responsive to a read of a selected control register of the control registers, validating the control register data associated with the selected control register based on the ECC associated with the control register data.

In an embodiment of the techniques presented herein, the method comprises storing the control register data and the ECC associated with the control register data in the selected control register.

In an embodiment of the techniques presented herein, the method comprises storing a hardware writable flag in each of the control registers, and outputting the control register data and the ECC associated with the control register data responsive to the hardware writable flag having a value indicating a software writable register.

In an embodiment of the techniques presented herein, the method comprises storing status register data in a selected status register of the first status register unit, reading the selected status register at the predetermined frequency, and responsive to reading the selected status register, masking the status register data by outputting masked data and an ECC associated with the masked data.

In an embodiment of the techniques presented herein, masking the status register data comprises outputting the masked data and the ECC associated with the masked data responsive to a hardware writable flag having a value indicating a hardware writable register.

In an embodiment of the techniques presented herein, reading the control registers at the predetermined frequency comprises reading the control registers based on a register map comprising addresses for the control registers.

In an embodiment of the techniques presented herein, the method comprises reading first status registers in the first status register unit, second status registers of a peripheral device, and second control registers of the peripheral device at the predetermined frequency, and responsive to a read of a second selected control register of the second control registers of the peripheral device, validating second control register data associated with the second selected control register based on a second ECC associated with the second control register data.

In an embodiment of the techniques presented herein, the method comprises responsive to a read of a selected second status register of the peripheral device, masking second status register data in the selected second status register by outputting masked data and an ECC associated with the masked data.

In an embodiment of the techniques presented herein, a computing system comprises a first processing complex including a first status register unit comprising first status registers, a second processing complex including a second status register unit comprising second status registers, a lockstep unit configured to verify redundancy in the first status registers and the second status registers, a control register unit connected to the lockstep unit and comprising control registers, and a scrubber configured to read the first status registers, the second status registers, and the control registers at a predetermined frequency, wherein the control registers are provided with end-to-end error correction code (ECC) protection.

In an embodiment of the techniques presented herein, the computing system comprises an ECC unit configured to, responsive to a read of a selected control register of the control registers by the scrubber, validate control register data stored in the selected control register based on an ECC associated with the control register data.

In an embodiment of the techniques presented herein, responsive to a read of a selected status register of the first status register unit, the first status register unit is configured to mask status register data stored in the selected status register by outputting masked data and an ECC associated with the masked data.

In an embodiment of the techniques presented herein, the computing system comprises a bus connected to the lockstep unit, a peripheral device connected to the bus and comprises second control registers, and third status registers, wherein the second control registers are provided with end-to-end error correction code protection, the third status registers are provided with redundancy protection, and the scrubber is configured to read the second control registers and the third status registers at the predetermined frequency.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computing system, comprising:
   a first processing complex including a first status register unit;
   a second processing complex including a second status register unit;
   a lockstep unit configured to check redundancy in the first status register unit and the second status register unit;
   a control register unit connected to the lockstep unit and comprising control registers, each configured to store control register data and an error correction code (ECC) associated with the control register data;

an ECC unit configured to, responsive to a read of a selected control register of the control registers, validate the control register data associated with the selected control register based on the ECC associated with the control register data; and a scrubber configured to read the control registers at a predetermined frequency to trigger the ECC unit to validate the control registers.

2. The computing system of claim 1, wherein the control register data and the ECC associated with the control register data are stored in the selected control register.

3. The computing system of claim 1, wherein:
the control registers are configured to store a hardware writable flag; and
the control register unit is configured to output the control register data and the ECC associated with the control register data responsive to the hardware writable flag having a value indicating a software writable register.

4. The computing system of claim 1, wherein:
the first status register unit comprises status registers configured to store status register data;
the scrubber is configured to read a selected status register of the status registers at the predetermined frequency; and
responsive to the read of the selected status register, the first status register unit is configured to mask the status register data by outputting masked data and an ECC associated with the masked data.

5. The computing system of claim 4, wherein:
each status register of the status registers comprises a hardware writable flag; and
the first status register unit is configured to output the masked data and the ECC associated with the masked data responsive to the hardware writable flag having a value indicating a hardware writable register.

6. The computing system of claim 4, wherein:
the scrubber comprises a register map comprising addresses for the control registers and addresses for the status registers; and
the scrubber is configured to read the control registers and the status registers at the predetermined frequency based on the register map.

7. The computing system of claim 1, wherein:
the first status register unit comprises first status registers;
the computing system comprises:
 a bus connected to the lockstep unit;
 a peripheral device connected to the bus and comprising:
  second control registers, each configured to store second control register data and a second ECC associated with the second control register data; and
  second status registers;
the scrubber is configured to read the second control registers, the first status registers, and the second status registers at the predetermined frequency; and
the ECC unit is configured to, responsive to a read of a second selected control register of the second control registers by the scrubber, validate the second control register data associated with the second selected control register based on the second ECC associated with the second control register data.

8. The computing system of claim 7, wherein:
each second status register of the second status registers is configured to store second status register data; and
responsive to a read of a selected second status register of the second status registers, the second status register unit is configured to mask the second status register data by outputting masked data and an ECC associated with the masked data.

9. A method comprising:
checking redundancy in a first status register unit of a first processing complex and a second status register unit of a second processing complex;
storing control register data and an error correction code (ECC) associated with the control register data in control registers of a control register unit;
responsive to a read of a selected control register of the control registers, validating the control register data associated with the selected control register based on the ECC associated with the control register data; and
reading the control registers at a predetermined frequency to trigger the validating of the control register data.

10. The method of claim 9, comprising:
storing the control register data and the ECC associated with the control register data in the selected control register.

11. The method of claim 9, comprising:
storing a hardware writable flag in each of the control registers; and
outputting the control register data and the ECC associated with the control register data responsive to the hardware writable flag having a value indicating a software writable register.

12. The method of claim 9, comprising:
storing status register data in a selected status register of the first status register unit;
reading the selected status register at the predetermined frequency; and
responsive to reading the selected status register, masking the status register data by outputting masked data and an ECC associated with the masked data.

13. The method of claim 12, wherein:
masking the status register data comprises outputting the masked data and the ECC associated with the masked data responsive to a hardware writable flag having a value indicating a hardware writable register.

14. The method of claim 12, wherein:
reading the control registers at the predetermined frequency comprises reading the control registers based on a register map comprising addresses for the control registers.

15. The method of claim 9, comprising:
reading first status registers in the first status register unit, second status registers of a peripheral device, and second control registers of the peripheral device at the predetermined frequency; and
responsive to a read of a second selected control register of the second control registers of the peripheral device, validating second control register data associated with the second selected control register based on a second ECC associated with the second control register data.

16. The method of claim 15, comprising:
responsive to a read of a selected second status register of the peripheral device, masking second status register data in the selected second status register by outputting masked data and an ECC associated with the masked data.

17. A computing system, comprising:
a first processing complex including a first status register unit comprising first status registers;
a second processing complex including a second status register unit comprising second status registers;

a lockstep unit configured to check redundancy in the first status registers and the second status registers;
a control register unit connected to the lockstep unit and comprising control registers; and
a scrubber configured to read the first status registers, the second status registers, and the control registers at a predetermined frequency, wherein:
   the control registers are provided with end-to-end error correction code (ECC) protection triggered by the scrubber to validate control register data associated with one or more of the control registers at the predetermined frequency.

18. The computing system of claim 17, comprising:
an ECC unit configured to, responsive to a read of a selected control register of the control registers by the scrubber, validate control register data stored in the selected control register based on an ECC associated with the control register data.

19. The computing system of claim 17, wherein:
responsive to a read of a selected status register of the first status register unit, the first status register unit is configured to mask status register data stored in the selected status register by outputting masked data and an ECC associated with the masked data.

20. The computing system of claim 17, comprising:
a bus connected to the lockstep unit; and
a peripheral device connected to the bus and comprising:
   second control registers; and
   third status registers, wherein:
      the second control registers are provided with end-to-end error correction code protection;
      the third status registers are provided with redundancy protection; and
      the scrubber is configured to read the second control registers and the third status registers at the predetermined frequency.

* * * * *